United States Patent
Lennings et al.

(10) Patent No.: US 10,920,928 B2
(45) Date of Patent: *Feb. 16, 2021

(54) ADJUSTABLE CARRIER ASSEMBLY FOR A HARNESS

(71) Applicant: Globe (Jiangsu) Co., Ltd., Jiangsu (CN)

(72) Inventors: Eric Lennings, Huskvarna (SE); Emma Ekberg, Goeteborg (SE); Minglong Zhong, Jiangsu (CN); Doushi Wang, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/615,058

(22) PCT Filed: Sep. 27, 2017

(86) PCT No.: PCT/CN2017/103738
§ 371 (c)(1),
(2) Date: Nov. 19, 2019

(87) PCT Pub. No.: WO2019/061091
PCT Pub. Date: Apr. 4, 2019

(65) Prior Publication Data
US 2020/0103073 A1    Apr. 2, 2020

(51) Int. Cl.
*A45F 3/10* (2006.01)
*F16M 13/04* (2006.01)
*A45F 3/14* (2006.01)

(52) U.S. Cl.
CPC ............... *F16M 13/04* (2013.01); *A45F 3/14* (2013.01); *A45F 3/10* (2013.01);
(Continued)

(58) Field of Classification Search
CPC ...... A45F 3/08; A45F 3/10; A45F 3/14; A45F 2003/146; F16M 13/04
(Continued)

(56) References Cited

U.S. PATENT DOCUMENTS 4,298,149 A * 11/1981 Gottschalk ............. F16M 13/00
224/201
5,004,135 A * 4/1991 Dufournet ............... A45F 3/047
224/262

(Continued)

FOREIGN PATENT DOCUMENTS

CA       2690446 A1    12/2008
CN      101854829 A    10/2010
(Continued)

OTHER PUBLICATIONS

Search Report and Written Opinion in related International Patent Application No. PCT/US2017/103738 dated Jul. 18, 2018; 8 pages

*Primary Examiner* — Justin M Larson
(74) *Attorney, Agent, or Firm* — Rooney IP, LLC

(57) ABSTRACT

A carrier assembly for a harness for carrying a motor-driven power tool, the carrier assembly including a back plate and an interface plate including connections for shoulder straps. The back plate includes a coupling interface on a front face arranged to be removably connected to a corresponding coupling interface on a rear face of the interface plate. The coupling interface of the back plate is adapted to be connected to and disconnected from the coupling interface of the interface plate in an at least partially translational or linear movement which is substantially parallel to the back plate.

8 Claims, 4 Drawing Sheets

(52) U.S. Cl.
CPC ... *A45F 2003/142* (2013.01); *A45F 2003/146* (2013.01); *A45F 2200/0575* (2013.01)

(58) Field of Classification Search
USPC .................................................. 224/631, 632
See application file for complete search history.

(56) References Cited

U.S. PATENT DOCUMENTS

| | | | | |
|---|---|---|---|---|
| D342,666 S | * | 12/1993 | DePack | D8/373 |
| 5,628,443 A | * | 5/1997 | Deutsch | A45C 7/0086 150/113 |
| 5,732,867 A | * | 3/1998 | Perkins | A45F 3/08 224/271 |
| 5,887,836 A | * | 3/1999 | Back | B63C 11/18 248/220.21 |
| 5,954,250 A | * | 9/1999 | Hall | A62B 9/04 224/262 |
| 6,326,766 B1 | * | 12/2001 | Small | H02J 7/0045 320/112 |
| 7,194,787 B2 | * | 3/2007 | Murai | A44B 11/00 24/614 |
| 7,198,186 B2 | * | 4/2007 | Kling | A62B 9/04 224/628 |
| 7,448,115 B2 | * | 11/2008 | Howell | A41D 13/0012 24/3.12 |
| 7,591,401 B2 | * | 9/2009 | Sandler | A45F 3/14 224/201 |
| 7,703,645 B2 | * | 4/2010 | Moskun | A45F 3/08 224/581 |
| 7,810,684 B2 | | 10/2010 | May | |
| 8,181,833 B2 | | 5/2012 | Wangeby et al. | |
| 8,622,268 B2 | * | 1/2014 | Townsend | A62B 25/00 224/576 |
| 9,220,333 B2 | * | 12/2015 | Losos | A45F 3/10 |
| 9,232,848 B2 | * | 1/2016 | Krikorian | A45F 3/14 |
| 9,332,821 B2 | * | 5/2016 | Janssen | A45F 3/04 |
| 9,668,567 B2 | * | 6/2017 | Gill | A45F 3/08 |
| 10,230,077 B2 | * | 3/2019 | Rief | A45F 3/04 |
| D849,332 S | * | 5/2019 | Ekberg | D29/124 |
| 10,299,570 B2 | * | 5/2019 | Kim | A45F 3/04 |
| 10,813,437 B2 | * | 10/2020 | Behringer | A45F 3/14 |
| 10,842,245 B2 | * | 11/2020 | Revels | A45F 3/10 |
| 2005/0045686 A1 | * | 3/2005 | Yeh | A45F 3/047 224/632 |
| 2011/0278339 A1 | * | 11/2011 | Hexels | F41H 1/02 224/676 |
| 2015/0041512 A1 | * | 2/2015 | Rief | A45F 3/04 224/633 |
| 2016/0270458 A1 | * | 9/2016 | Conrad | H01M 2/1005 |
| 2016/0345714 A1 | * | 12/2016 | Yamaoka | E01H 1/0809 |
| 2017/0105509 A1 | | 4/2017 | Gill et al. | |
| 2018/0228271 A1 | * | 8/2018 | Rasmussen | A45F 3/08 |
| 2019/0074489 A1 | * | 3/2019 | Yamaoka | A45F 3/04 |
| 2019/0110650 A1 | * | 4/2019 | Mobarak | A47L 5/225 |
| 2020/0085172 A1 | * | 3/2020 | Nordmann | B25F 5/02 |
| 2020/0085173 A1 | * | 3/2020 | Nordmann | A45F 3/08 |
| 2020/0103073 A1 | * | 4/2020 | Lennings | A45F 3/14 |
| 2020/0178677 A1 | * | 6/2020 | Lennings | A45F 3/14 |
| 2020/0253360 A1 | * | 8/2020 | Hahn | H01M 10/613 |
| 2020/0275763 A1 | * | 9/2020 | Lennings | A45F 5/00 |
| 2020/0323312 A1 | * | 10/2020 | Lennings | A45F 3/04 |

FOREIGN PATENT DOCUMENTS

| | | |
|---|---|---|
| CN | 103371020 A | 10/2013 |
| CN | 106820546 A | 6/2017 |
| WO | 2008147256 A1 | 12/2008 |

* cited by examiner

ADJUSTABLE CARRIER ASSEMBLY FOR A HARNESS

TECHNICAL FIELD

The present invention relates generally to an adjustable carrier assembly for a harness with adjustable shoulder straps.

BACKGROUND ART

There is a wide variety of clearing saws and brush cutters in use in modern forestry and garden maintenance. This type of equipment is intended to be handled by one person alone, and since the equipment could be quite heavy and its vibrations and the possible counter forces, caused by the branches being cut, have to be considered, one readily realizes the need for some sort of harness to aid the user in carrying the weight of the equipment.

The simplest type of harness consists of a single band, which is worn by the user over one shoulder and across the back and chest respectively, to support the equipment at hip level. While this solution is sufficient for lighter equipment which is used seldom and during short periods of time, it is not adequate for professional users who use the equipment for days on end. As the clearing saws are usually designed for use on one side of the user's body, the load will always be carried on one and the same shoulder, which could cause strain in the user's body in the long run. A better type of harness comprises one shoulder strap over each shoulder, a waist belt, a side strap, and a back plate to which all straps are connected. Quite often a shock-absorbing hip-pad is attached as well, against which a part of the equipment is supported during use. The different straps may be adjusted to the size of the user.

One disadvantage with the latter type of harness is that by adjusting the shoulder straps to accommodate very tall or short users, the comfort and weight-distributing performance of the harness is compromised. For a tall user, the shoulder straps may have to be maximally extended, which renders the harness more unstable, and for a short user there is the risk that the waist belt will be placed too low on the body, which is uncomfortable, and may give a suboptimal weight distribution.

WO 2008/147256 discloses an adjustable harness for evenly distributing the weight of the equipment during use having a back plate comprising two rigid plate portions connected to each other to allow mutual rotation in a plane defined by the back plate. The connection is of a snap-fit type where a central boss on the upper plate portion fits into one of three holes on the lower plate portion. The holes are placed at different distances from the bottom of the lower plate portion corresponding to three distinct sizes of the back plate. However, disconnection and reconnection of the plate portions when changing the size is still quite cumbersome and the harness may only be adjusted between three distinct sizes.

SUMMARY OF INVENTION

An object of the present invention is to provide an improved harness which facilitates individual size adjustment. This object is now achieved by an adjustable carrier assembly for carrying a motor-driven power tool according to a first aspect of the present invention, the adjustable carrier assembly comprising a back plate and an interface plate including connections for shoulder straps, wherein the back plate comprises a coupling interface arranged to be removably connected to a corresponding coupling interface of the interface plate, wherein the coupling interface of the back plate is adapted to be connected to and disconnected from the coupling interface of the interface plate in an at least partially translational or linear movement which is substantially parallel to the back plate. The translational or linear movement of the interface plate with respect to the back plate allows for simpler and quicker adjustment of the size through a sliding motion. Additionally, the user will then no longer be required to disassemble and reassemble the back plate of the harness to change the size, contrary to what is known from the prior art.

In a preferred embodiment, the coupling interface of the back plate comprises two parallel raised ridges extending in a substantially longitudinal direction of the back plate, each having at least one overhanging flange and an L-shaped cross section with the flanges facing towards or away from each other, and the coupling interface of the interface plate comprises corresponding raised ridges, each having at least one overhanging flange and an L-shaped cross section with the flanges facing in the opposite direction of the corresponding flanges of the back plate, wherein the ridges are arranged such that when the back plate and the interface plate are aligned with each other and brought together in a translational or linear movement parallel to the ridges, the flanges are slid into locking engagement with each other to retain the interface plate on the back plate. The solution with the raised ridges and overhanging flanges provides a secure connection between the interface plate and the back plate which ensures that the interface plate cannot be removed from the back plate in a direction perpendicular to the surface of the back plate.

In an alternative embodiment, the back plate further comprises a plurality of locking projections arranged in two parallel rows extending in a direction parallel to the longitudinal extension of the back plate, wherein the interface plate comprises a pair of resilient locking tabs arranged to come into locking engagement with a corresponding pair of locking projections to lock the position of the interface plate with respect to the back plate. The plurality of locking projections provides incremental size adjustment of the interface plate including the connections for shoulder straps with respect to the back plate along the length of the back plate, thus allowing the user to adapt the size on an individual level. The locking engagement ensures that the interface plate remains in place on the back plate during use.

In a further preferred embodiment, the resilient locking tabs are formed as ribs extending in a direction parallel to the ridges on the interface plate into an opening therein and comprise a main portion having a lateral projection adapted to engage the locking projections of the back plate, and a web portion connecting a distal end of the main portion to a central rib arranged between and at a distance from the locking tabs. The resilient locking tabs may easily be disengaged from the locking projections to allow removal of the interface plate from the back plate. The web portion acts to bias the resilient locking tab towards the locking engagement position.

In an advantageous embodiment, the central rib comprises a flange and has a T-shaped cross section, wherein the back plate comprises a central through-going slot arranged to receive the central rib when the back plate and the interface plate are aligned with each other and brought together in a translational or linear movement parallel to the ridges such that the flange is slid into locking engagement with the surface on the opposite side of the back plate. The T-shaped cross section of the central rib and flange provide additional retention of the interface plate on the back plate as well as guiding of the interface plate during insertion using the translational or linear movement.

In a further preferred embodiment, a proximal side of the locking projections in an insertion direction of the interface plate has a bevelled or chamfered surface. In addition, or as an alternative, a distal side of the resilient locking tabs in an insertion direction of the interface plate has a bevelled or chamfered surface. The bevelled or chamfered surfaces act to smoothly deflect the resilient locking tab laterally when the interface plate is inserted into the back plate by translational or linear movement, such that the resilient locking tabs can move past the locking projections. Once the resilient locking tabs have passed one pair of locking projections, the former spring back into locking engagement with the subsequent pair of locking projections.

In an alternative embodiment, leading and/or trailing edges of the flanges in an insertion direction of the interface plate has a bevelled or chamfered surface. The bevelled or chamfered surfaces provide a smooth sliding motion when inserting the interface plate onto the back plate.

In a second aspect of the present invention, there is provided a harness comprising an adjustable carrier assembly according to the first aspect.

BRIEF DESCRIPTION OF DRAWINGS

The invention is now described, by way of example, with reference to the accompanying drawings, in which.

DESCRIPTION OF EMBODIMENTS

Figure 1A:
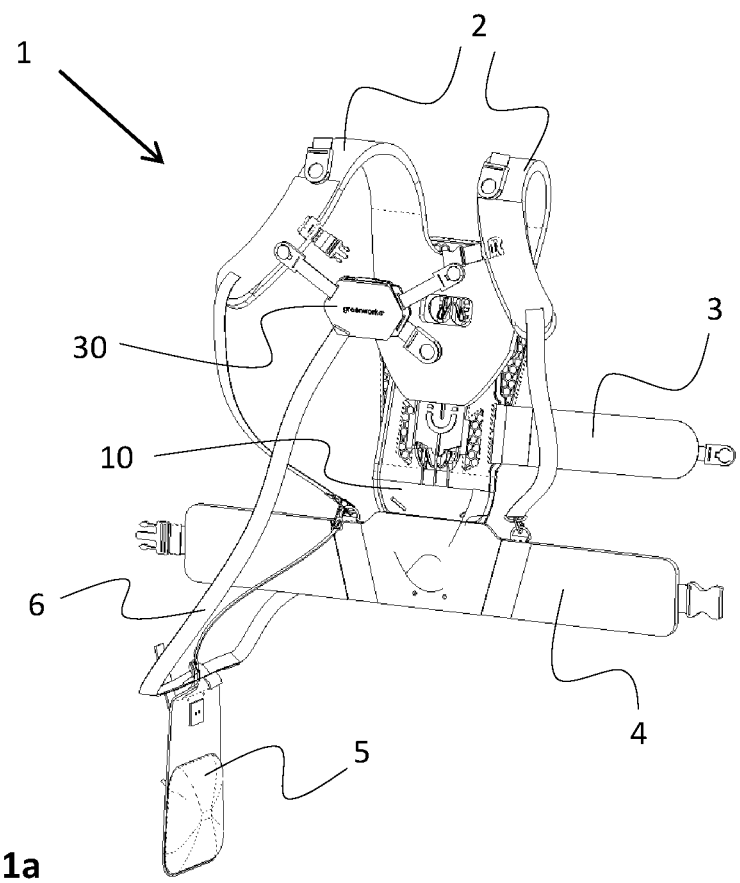
FIGS. 1a and 1b show front and rear perspective views, respectively, of an exemplary harness comprising an adjustable carrier assembly according to the present invention.

In the following, a detailed description of an adjustable carrier assembly according to the invention is presented. In the drawing figures, like reference numerals designate identical or corresponding elements throughout the several figures. It will be appreciated that these figures are for illustration only and are not in any way to be seen as restricting the scope of the invention.

In the context of the present invention, the terms 'front' and 'rear' shall be interpreted in relation to the operator when wearing the harness including the carrier assembly. Thus, surfaces facing in the forward direction of the operator shall be designated rear faces and surfaces facing in the opposite, backward direction of the operator shall be designated rear faces.

Figure 1B:
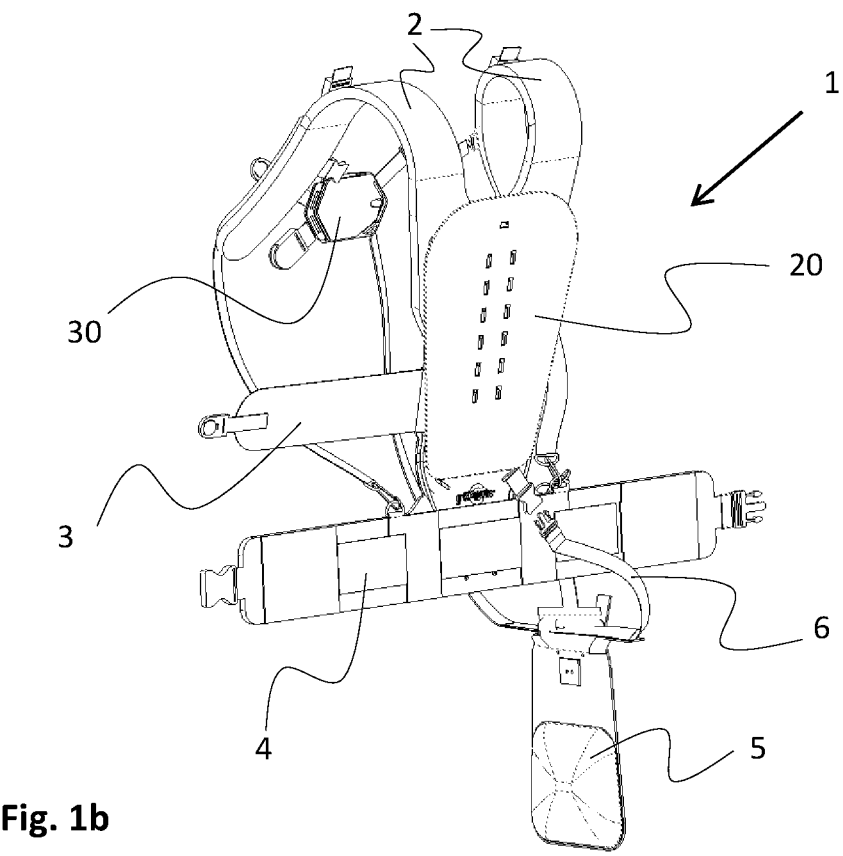

FIGS. 1a and 1b show in perspective views the front and rear of an exemplary harness 1 for carrying a handheld, motor-driven power tool (not shown) of the kind described in the introductory portion, which may be used together with a carrier assembly according to the present invention. The harness 1 comprises a pair of shoulder straps 2 to be worn on the shoulders by the operator. The shoulder straps 2 are connected to a back plate 10 by means of an adjustable carrier assembly (not shown). Further, on one side of the back plate 10 there is attached a side strap 3 for providing additional stability and support when carrying the power tool. In a bottom portion of the back plate 10, a hip belt 4 is attached to be worn around the hips by the operator. On the opposite side of the side strap 3, there is provided a hip plate 5 comprising means (not shown) for attaching the power tool. The hip plate 5 is connected to the harness 1 by means of strap 6, which attaches to the back plate 10 on the rear face of the harness 1, as shown in FIG. 1b. On the rear face of the harness 1, there is provided a chest buckle 30 arranged for attachment of the strap 6 for the hip plate 5, the side strap 3 and connecting straps to the shoulder straps 2 to keep the harness 1 in place on the body of the operator during use and allow for distribution of forces caused by the weight of the power tool.

The harness 1 is designed to provide a comfortable fit for the operator, distribute the forces caused by the weight of the power tool and allow freedom of movement for the operator during operation of the power tool.

As mentioned above, one of the objects of the present invention is to provide an improved harness which facilitates individual size adjustment. To this end, an adjustable carrier assembly for the connection between the back plate 10 and the shoulder straps 2 is provided.

Figure 2A:
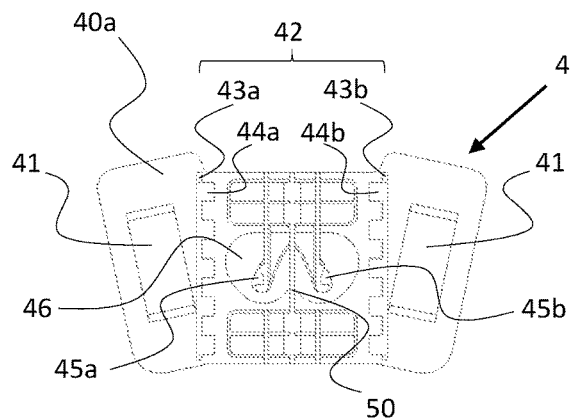
FIGS. 2a and 2b show face views of rear and front faces, respectively, of an interface plate forming part of an adjustable carrier assembly according to the present invention.
Figure 2B:
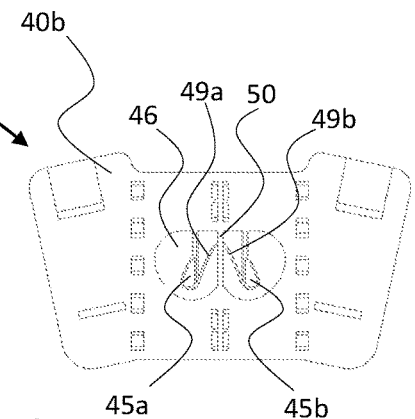

In FIGS. 2a and 2b, an interface plate 40 of the adjustable carrier assembly is illustrated in rear and front views, respectively. The rear face 40a of the interface plate 40 as shown in FIG. 2a is arranged to face the front face 10b of the back plate 10, as shown in FIG. 3b. Laterally on each side of the interface plate 40 there is provided connection means 41 for attaching shoulder straps 2 of a harness 1, e.g. such as shown in FIGS. 1a and 1b. The connection means 41 may comprise slots for passage of the shoulder straps 2 there through, or other suitable means for attaching the shoulder straps 2. A coupling interface 42 of the interface plate 40 is arranged on the rear face 40a and comprises two parallel raised ridges 43a, 43b. The raised ridges 43a, 43b extend in a direction along the interface plate 40 which coincides with the insertion direction of the interface plate 40 onto the back plate 10 when assembling the adjustable carrier assembly. FIG. 2b shows the front face 40b of the interface plate 40.

Figure 4:
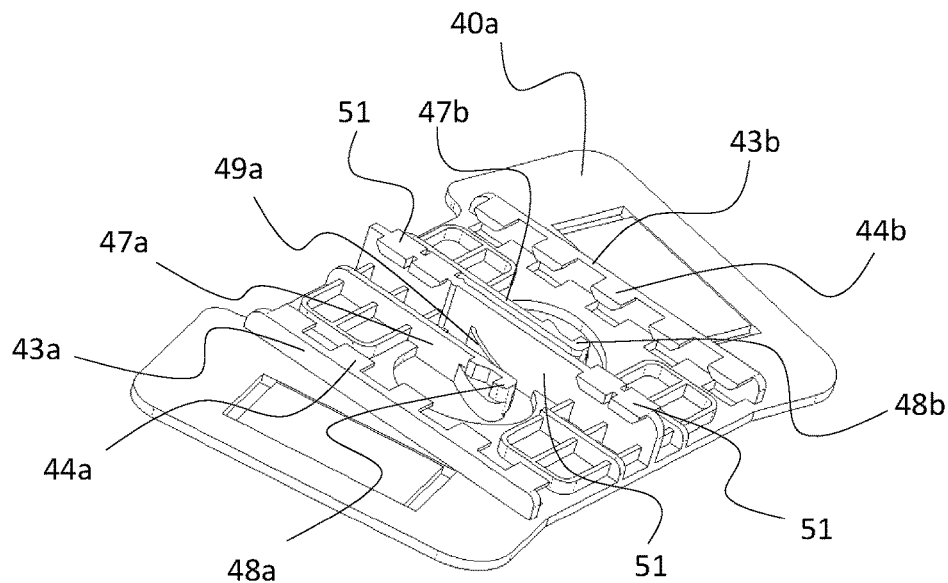
FIG. 4 shows a perspective view of the rear face of the interface plate of FIGS. 2a and 2b.

Each of the raised ridges 43a, 43b comprises at least one overhanging flange 44a, 44b, more clearly shown in FIG. 4. The flanges 44a, 44b may comprise a plurality of regularly spaced apart flanges along the raised ridges 43a, 43b as shown in FIGS. 2a and 4, or may comprise a single continuous flange (not shown) along the length of the raised ridges 43a, 43b. The flanges 44a, 44b and the raised ridges 43a, 43b together present an L-shaped cross section.

Figure 3A:
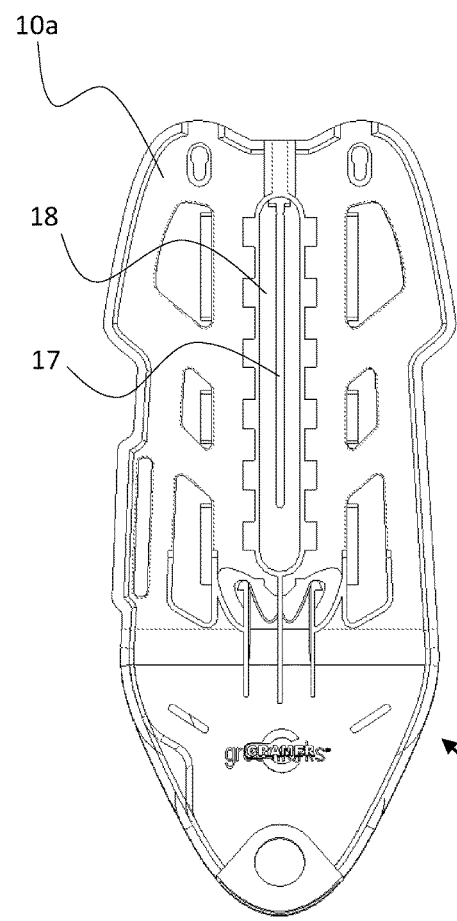
FIGS. 3a and 3b show face views of rear and front faces, respectively, of a back plate forming part of an adjustable carrier assembly according to the present invention.
Figure 3B:
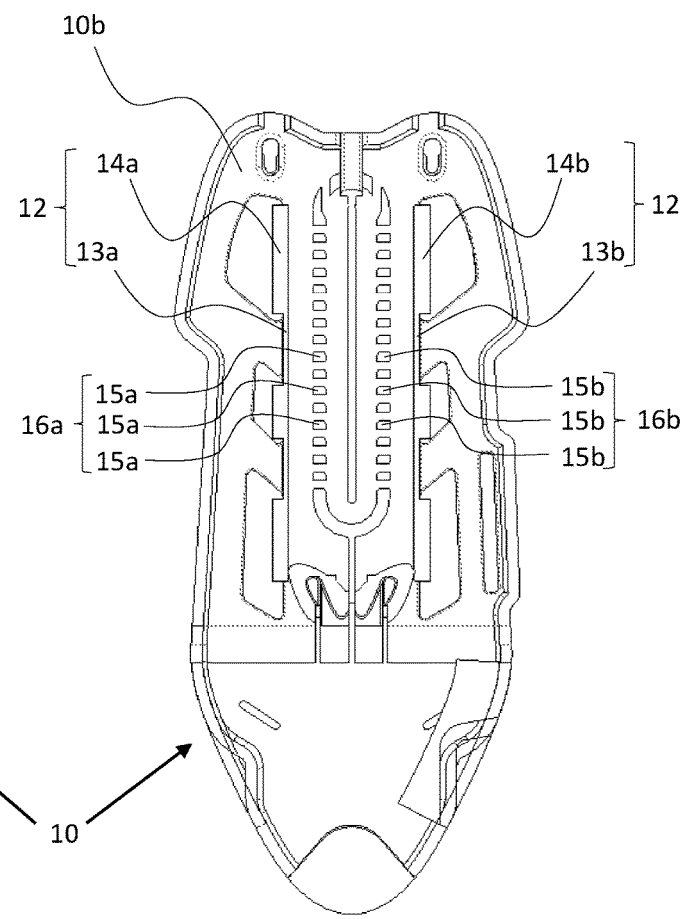

In FIGS. 3a and 3b, a back plate 10 of the adjustable carrier assembly is illustrated in rear and front views, respectively. The back plate 10 similarly comprises a corresponding coupling interface 12 on its front face 10b, arranged to face the rear face 40a of the interface plate 40, and comprising two parallel raised ridges 13a, 13b. The raised ridges 13a, 13b extend in a longitudinal direction of the back plate 10 which coincides with the insertion direction of the interface plate 40 onto the back plate 10 when assembling the adjustable carrier assembly.

Figure 5:
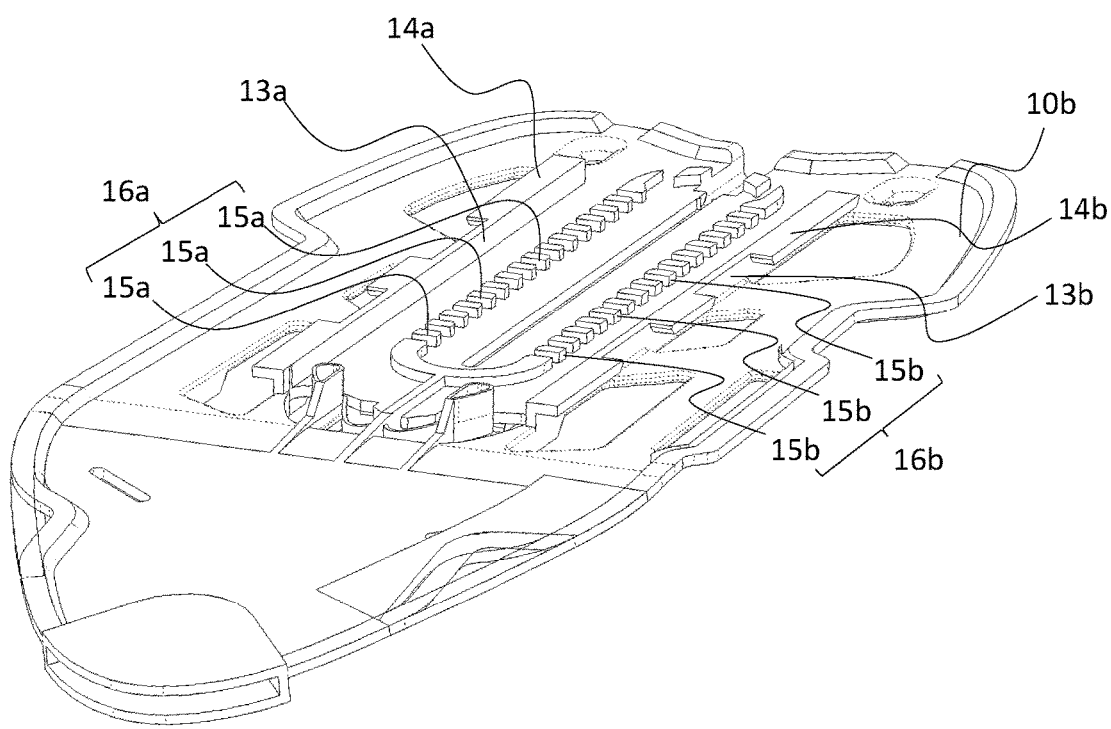
FIG. 5 shows a perspective view of the front face of the back plate of FIGS. 3a and 3b.
Figure 6A:
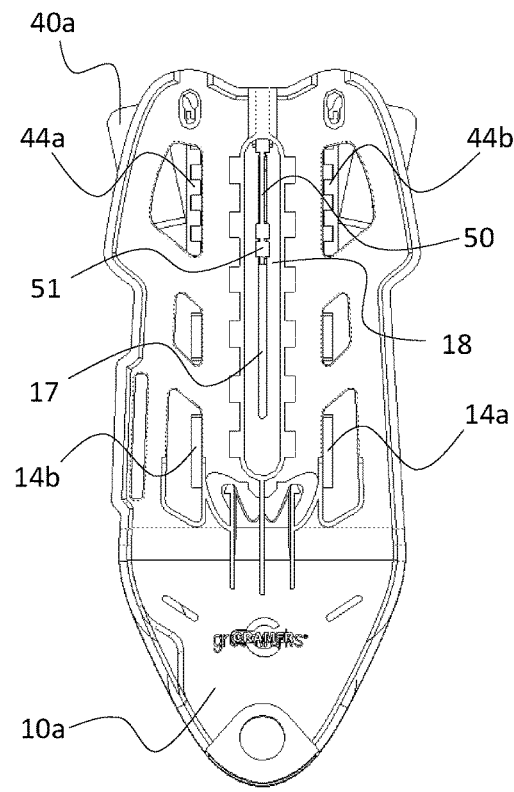
FIGS. 6a and 6b show face views of the rear and front faces of a carrier assembly according to the present invention assembled together.
Figure 6B:
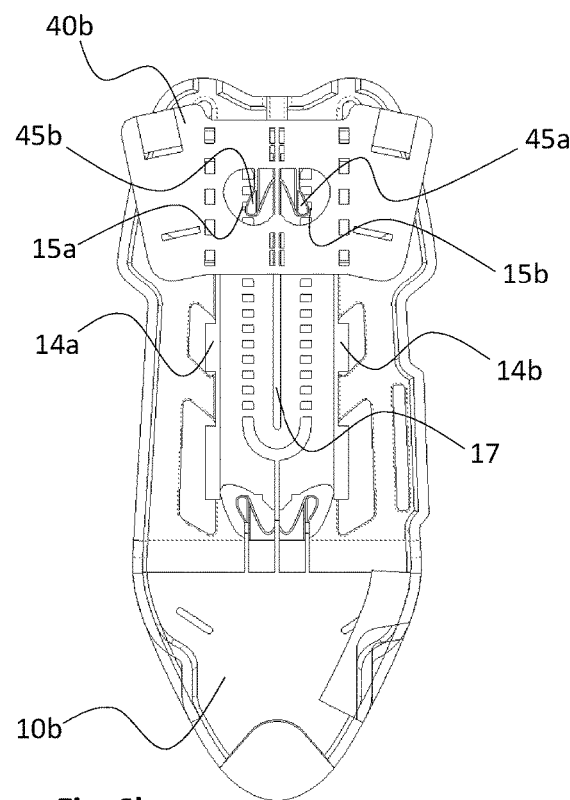
Figure 7A:
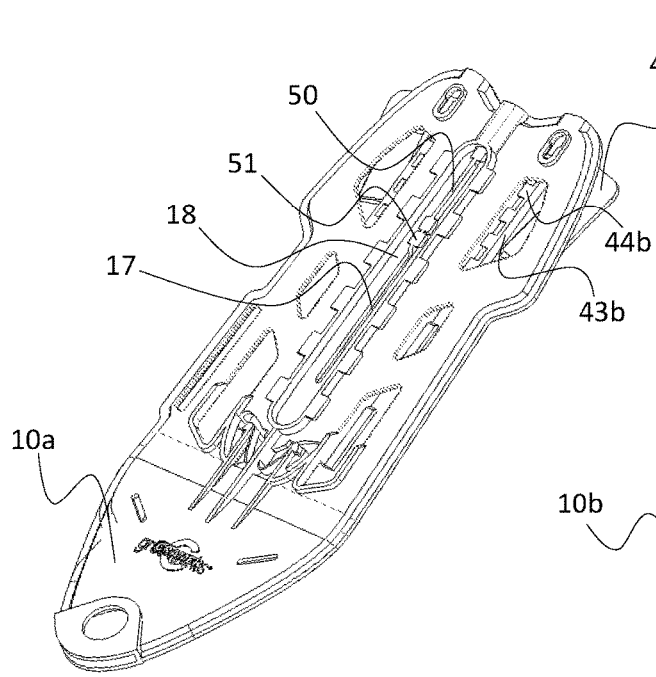
FIGS. 7a and 7b show perspective views of the rear and front faces of a carrier assembly according to the present invention assembled together.
Figure 7B:
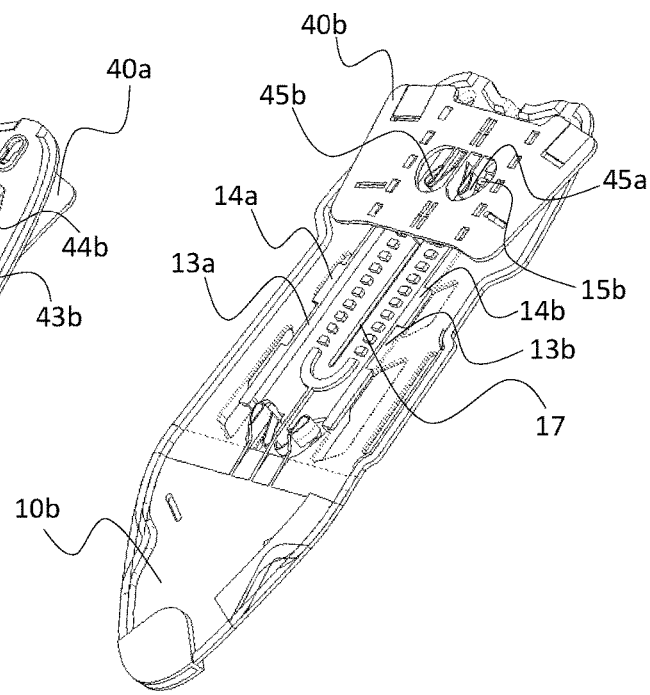

Each of the raised ridges 13a, 13b comprises at least one overhanging flange 14a, 14b, more clearly shown in FIG. 5. The flanges 14a, 14b may comprise a plurality of regularly spaced apart flanges along the raised ridges 13a, 13b as shown in FIGS. 3a and 5, or may comprise a single continuous flange (not shown) along the length of the raised ridges 13a, 13b. The flanges 14a, 14b and the raised ridges 13a, 13b together present an L-shaped cross section.

The distance between the raised ridges 13a, 13b of the back plate 10 and the raised ridges 43a, 43b of the interface plate 40 is adapted such that when the interface plate 40 is aligned with the back plate 10 they may be brought together in a translational or linear movement using a sliding motion parallel to the raised ridges 13a, 13b; 43a, 43b. The sliding motion is effected substantially in a longitudinal direction of the back plate 10. As the interface plate 40 and back plate 10 are assembled together, the flanges 44a, 44b of the interface plate 40 are slid into locking engagement with the flanges 14a, 14b of the back plate 10. Thus, the interface plate 40 and the back plate 10 are prevented from being separated in a direction perpendicular to the plane defined by the back plate 10.

Turning back to FIGS. 2a and 4, the interface plate 40 further comprises a through-going opening 46 arranged centrally between the raised ridges 43a, 43b. A pair of resilient locking tabs 45a, 45b extend into the opening 46 in a direction substantially parallel to the raised ridges 43a, 43b. The locking tabs 45a, 45b are formed as ribs and comprise a main portion 47a, 47b having a lateral projection 48a, 48b at a distal, free end thereof, as seen in the insertion direction of the interface plate 40 onto the back plate 10, i.e. downwards in FIGS. 2a and 2b; 3a and 3b. Additionally, the distal end of the main portion 47a, 47b are connected to a central rib 50, which bisects the opening 46, by means of web portions 49a, 49b. The web portions 49a, 49b act as springs to bias the locking tabs 45a, 45b laterally outward, away from the central rib 50.

The central rib 50 extends parallel to the raised ridges 43a, 43b at equal distance from the locking tabs 45a, 45b. At least one overhanging flange 51 is provided on the central rib 50 such that they together present a T-shaped cross section. The flange 51 may comprise several flanges spaced regularly along the central rib 50, as shown in FIGS. 2a and 4, or comprise a single continuous flange along the length of the central rib 50 (not shown).

Referring now to FIGS. 3b and 5, the front face 10b of the back plate 10 comprises a plurality of locking projections 15a; 15b arranged in two parallel rows 16a, 16b in a longitudinal direction of the back plate 10, substantially parallel to the raised ridges 13a, 13b. The locking projections 15a; 15b are spaced apart with regular intervals to define a plurality of locking positions. Arranged centrally on the back plate 10 between the rows 16a, 16b of the locking projections 15a; 15b is a through-going slot 17 extending substantially the same length as the two rows 16a, 16b. Adjacent the slot 17 on both sides is a surface 18.

The locking tabs 45a, 45b of the interface plate 40 are arranged to come into locking engagement with the locking projections 15a; 15b of the back plate 10 when the adjustable carrier assembly is assembled. To this end, the lateral projections 48a, 48b on the resilient locking tabs 45a, 45b comprise a transversal surface, substantially perpendicular to and facing in the opposite direction of the insertion direction of the interface plate 40. During insertion of the interface plate 40 onto the back plate 10, the resilient locking tabs 45a, 45b are deflected laterally inwards toward the central rib 50 by the operator. When a desired locking position corresponding to a pair of locking projections 15a, 15b has been reached, the web portions 49a, 49b act on the main portions 47a, 47b to bias the locking tabs 45a, 45b away from the central rib 50 into a space between two adjacent locking projections 15a; 15b. The lateral projections 48a, 48b engage the pair of locking projections 15a, 15b to ensure that the interface plate 40 cannot move in relation to the back plate 10. To release the locking engagement between the locking tabs 45a, 45b and the locking projections 15a, 15b, the operator simply deflects the locking tabs 45a, 45 by a two-finger grip and slides the interface plate 40 to a new desired position thus adjusting the shoulder straps 2 of the harness 1 to a different size. The adjustable carrier assembly may thus be adjusted in incremental steps corresponding to the number of locking projections 15a; 15b on the back plate 10.

Simultaneously, when the interface plate 40 is inserted onto the back plate 10, the central rib 50 is slid into slot 17 and the flange 51 is brought into locking engagement with the surface 18 on the rear face 10a of the back plate 10 in a similar fashion to the flanges 44a, 44b and 14a, 14b. Thus, the central rib 50 and flange 51 provide additional support and stability to the adjustable carrier assembly.

In order to facilitate smooth operation of the sliding motion, the distal side of the locking tabs 45a, 45b and/or the proximal side of the locking projections 15a; 15b in the insertion direction of the interface plate 40 onto the back plate 10 may comprise a bevelled or chamfered surface. In a similar fashion, leading and trailing edges of the flanges 14a, 14b; 44a, 44b; 51 in the insertion direction of the interface plate 40 may comprise bevelled or chamfered surfaces.

The invention claimed is:

1. An adjustable carrier assembly for a harness for carrying a motor-driven power tool, the adjustable carrier assembly comprising a back plate and an interface plate including connections for shoulder straps, wherein the back plate comprises a coupling interface on a front face thereof arranged to be removably connected to a corresponding coupling interface on a rear face of the interface plate, wherein the coupling interface of the back plate is adapted to be connected to and disconnected from the coupling interface of the interface plate in an at least partially translational or linear movement which is substantially parallel to the back plate;

wherein the back plate further comprises a plurality of locking projections arranged in two parallel rows extending in a direction parallel to the longitudinal extension of the back plate, wherein the interface plate comprises a pair of resilient locking tabs arranged to come into locking engagement with a corresponding pair of locking projections to lock the position of the interface plate with respect to the back plate.

2. The adjustable carrier assembly according to claim 1, wherein the coupling interface of the back plate comprises two parallel raised ridges extending in a substantially longitudinal direction of the back plate, each having at least one overhanging flange and presenting an L-shaped cross section with the flanges facing towards or away from each other, and the coupling interface of the interface plate comprises corresponding raised ridges, each having at least one overhanging flange and presenting an L-shaped cross section with the flanges of the interface plate facing in the opposite direction of the flanges of the back plate, wherein the raised ridges are arranged such that when the back plate and the interface plate are aligned with each other and brought together in a translational or linear movement parallel to the raised ridges, the flanges are slid into locking engagement with each other to retain the interface plate on the back plate.

3. The adjustable carrier assembly according to claim 1, wherein the resilient locking tabs are formed as ribs extending in a direction parallel to the raised ridges on the interface plate into an opening therein and each comprises a main portion having a lateral projection adapted to engage the locking projections of the back plate, and a web portion connecting a distal end of the main portion to a central rib arranged between and at a distance from the locking tabs.

4. The adjustable carrier assembly according to claim 3, wherein the central rib comprises a flange and has a T-shaped cross section, wherein the back plate comprises a central through-going slot arranged to receive the central rib when the back plate and the interface plate are aligned with each other and brought together in a translational or linear movement parallel to the raised ridges such that the flange is slid into locking engagement with a surface on a rear face of the back plate.

5. The adjustable carrier assembly according to claim 1, wherein a proximal side of the locking projections in an insertion direction of the interface plate has a bevelled or chamfered surface.

6. The adjustable carrier assembly according to claim 1, wherein a distal side of the resilient locking tabs in an insertion direction of the interface plate has a bevelled or chamfered surface.

7. The adjustable carrier assembly according to claim 4, wherein leading and/or trailing edges of the flanges in an insertion direction of the interface plate has a bevelled or chamfered surface.

8. A harness comprising an adjustable carrier assembly according to claim 1.

* * * * *